US010871585B2

(12) United States Patent
Rahmes et al.

(10) Patent No.: US 10,871,585 B2
(45) Date of Patent: Dec. 22, 2020

(54) SYSTEM FOR PROCESSING SEISMIC DATA BASED UPON LINEAR OPTIMIZATION AND RELATED METHODS

(71) Applicant: Harris Corporation, Melbourne, FL (US)

(72) Inventors: Mark D. Rahmes, Melbourne, FL (US); Jessica L. Ascough, Melbourne, FL (US); George W. Lemieux, Indian Harbour Beach, FL (US); Raquel M. Cohen, Orlando, FL (US)

(73) Assignee: HARRIS CORPORATION, Melbourne, FL (US)

( * ) Notice: Subject to any disclaimer, the term of this patent is extended or adjusted under 35 U.S.C. 154(b) by 316 days.

(21) Appl. No.: 15/227,162

(22) Filed: Aug. 3, 2016

(65) Prior Publication Data

US 2018/0038975 A1 Feb. 8, 2018

(51) Int. Cl.
*G01V 1/30* (2006.01)

(52) U.S. Cl.
CPC .............. *G01V 1/306* (2013.01); *G01V 1/303* (2013.01); *G01V 2210/6222* (2013.01); *G01V 2210/6224* (2013.01)

(58) Field of Classification Search
CPC ................... G01V 1/303; G01V 1/306; G01V 2210/6222; G01V 2210/6224
See application file for complete search history.

(56) References Cited

U.S. PATENT DOCUMENTS

| 4,422,165 A * | 12/1983 | Thomas | G01V 1/303 367/40 |
| 6,424,918 B1 | 7/2002 | Jorgensen et al. | |
| 7,047,224 B1 * | 5/2006 | Neuneier | G06Q 10/00 706/12 |
| 7,373,252 B2 | 5/2008 | Sherrill et al. | |
| 8,688,381 B2 * | 4/2014 | Routh | G01V 1/282 702/2 |
| 9,223,041 B2 * | 12/2015 | Wendt | G01V 11/00 |
| 9,702,998 B2 | 7/2017 | Bansal et al. | |
| 2006/0221767 A1 * | 10/2006 | Foy | G01V 1/362 367/52 |

(Continued)

OTHER PUBLICATIONS

U.S. Appl. No. 15/054,328, filed Feb. 26, 2016.
(Continued)

*Primary Examiner* — Catherine T. Rastovski
(74) *Attorney, Agent, or Firm* — Allen, Dyer, Doppelt, + Gilchrist, P.A.

(57) ABSTRACT

A system is for processing seismic data for a geologic formation generated by an array of acoustic transducers responsive to an acoustic source. The system may include a seismic data storage device, and a processor cooperating with the seismic data storage device to generate correlations of data from the array of acoustic transducers based upon a current estimate for at least one of density and velocity of the geologic formation, and perform a linear optimization based upon a plurality of different combinations of the correlations to determine a given subset of correlations having a highest objective function associated therewith. The processor may also update the current estimate for at least one of density and velocity of the geologic formation based upon the given subset of correlations.

20 Claims, 10 Drawing Sheets

(56) References Cited

U.S. PATENT DOCUMENTS

2011/0247829 A1   10/2011   Dobin et al.
2015/0278284 A1*  10/2015   Bordignon .......... G06F 16/2365
                                                                          707/693

OTHER PUBLICATIONS

U.S. Appl. No. 15/054,302, filed Feb. 26, 2016.
U.S. Appl. No. 15/227,180, filed Aug. 3, 2016.
Alexander, Carol. "Principal component models for generating large GARCH covariance matrices." Economic Notes 31.2 (2002): 337-359. Abstract Only.
Alexander, Carol. "Orthogonal FARCH" Mastering Risk: vol. 2 (2001): 21-38.
Wu et al. "Volatility modelling of multivariate financial time series by using ICA-GARCH models." Intelligent Data Engineering and Automated Learning—IDEAL 2005. Springer Berlin Heidelberg; vol. 3576 of the series Lecture Notes in Computer Science: 571-579. Abstract Only.
Chengshu Wang "Velocity estimation from seismic data by nonlinear inversion and characterization of gas hydrate deposits offshore Oregon" ProQuest Dissertations and Theses Global, 2003; ISBN-13: 9780496638925; Paper No. 3116457; Publisher: ProQuest LLC: pp. 164.
Iivanova et al. "Applying velocity analysis to 3D seismic-based mapping error quantification" Conference: Petroleum Geostatistics 2007, Sep. 10, 2007-Sep. 14, 2007; European Association of Geoscientists and Engineers, EAGE. Abstract Only.
Anonamous http://sepwww.stanford.edu/data/media/public/oldreports/sep45/45_01.pdf: pp. 4.
Tsvankin et al. "Seismic anisotropy in exploration and reservoir characterization: an overview" www.cwp.mines.edu/Meetings/Project10/cwp-642P.pdf: Retrieved from internet Aug. 24, 2016: pp. 22.
"Eni Upstream Research: Rubust real-time control" http://enimitalliance.mit.edu/research/eni-upstream-research/ recrieved from internet Jun. 28, 2016; pp. 5.
Ogata, Y. "Statistical model for standard seismicity and detection of anomalies by residual analysis" repository.kulib.kyoto-u.ac.jp/dspace/bitstream/2433/94789/1/KJ . . . : Nov. 20, 1991; pp. 348-363.
Remote Sensing: Understanding the earth for a safer world IGARSS 2015: Jul. 26-31, 2015;List of Accepted Papers: www.igarss2015.org/Papers/AcceptedPapers.asp. Abstract Only.
Cohen et al. "Q-Learning Multi-Objective Sequential Optimal Sensor Parameter Weights", IMCIC, Mar. 11, 2016 (Best Session Paper): pp. 6.
Rahmes et al. "Correlating Social Pattern Attributes for Predicting Terrorist Activities", MILCOM Conference, Oct. 2016. pp. 6.
Ahmad Riza Ghazali True-amplitude seismic imaging beneath gas clouds: TU Delft, Delft University of Technology, 2011. pp. 157.
Zhe et al. "Non-linear prestack seismic inversion with global optimization using an edge-preserving smoothing filter" Geophysical Prospecting: vol. 61, issue 4, Jul. 2013: 747-760; Abstract Only.
Kissling et al. "Model parametrization in seismic tomogragraphy; a choice of consequence for the solution quality" Physics of the Earth and Planetary Interiors 123 (2001) hestia.upmc.fr/~boschi/tomography/Kisslingetal.PEPI.2001.pdf: pp. 89-101.
Ran Zhang "Efficient Parameter Estimation in the High-Dimensional Inverse Problem of Seismic Tomography" Technical University of Munich: pp. 85.
Hafner et al. "Multivariate time series models for asset prices" www.rmi.nus.edu.sg/csf/webpages/Authors/abstract/Hafner_abstract.pdf; Nov. 27, 2008; Abstract Only.
"Available CRAN Packages by Name" https://cran.r-project.org/web/packages/available_packages_by_name.html ACDm, Tools for Autoregressive Conditional Duration Models. pp. 1.

* cited by examiner

SYSTEM FOR PROCESSING SEISMIC DATA BASED UPON LINEAR OPTIMIZATION AND RELATED METHODS

TECHNICAL FIELD

The present invention relates to the field of data modeling, and, more particularly, to modeling systems such as seismic surveying and modeling systems and related methods.

BACKGROUND

In sub-surface geological surveying, such as for oil and gas exploration, various approaches are used in an attempt to "see" below ground to help determine what is in the given geological formation before going to the expense of drilling an exploratory well. One such approach is to direct compressional or "P" waves at the geological surface and measure the returns from the waves reflecting off of different materials in the ground. Another related approach is to use shear or "S" waves for this same purpose, which propagate through solids only.

Various difficulties may arise with such approaches when there are obstructions in the geological formation that cause distorted or no signal returns for certain areas within the geological formation. For example, one such obstruction is gas clouds in a geological formation, which may distort or cause anomalies in the signature data returned, and/or make it appear that certain areas (such as oil deposits) are located at the wrong depth in the formation. Thus, even knowing that there is an oil formation beneath a gas cloud, it is still possible that a well being drilled may miss the deposit because of drilling to an incorrect depth. Moreover, there may be other types of obstructions in the formations (e.g., water pockets, basalt, volcanic rock layers, etc.) that may block signal returns altogether in some areas, resulting in incomplete data sets from P or S wave signal collection.

One approach to detecting geologic anomalies is set forth in U.S. Pat. Pub. No. 2011/0247829 to Dobin et al. This reference discloses a method for identifying a geologic object through cross sections of a geologic data volume. The method includes obtaining a geologic data volume having a set of cross sections. Then, two or more cross sections are selected and a transformation vector is estimated between the cross sections. Based on the transformation vector, a geologic object is identified within the geologic data volume.

Despite the existence of such approaches, further advancements in processing seismic survey data sets for anomaly detection may be desirable in certain applications.

SUMMARY

A system is for processing seismic data for a geologic formation generated by an array of acoustic transducers responsive to an acoustic source. The system may include a seismic data storage device, and a processor cooperating with the seismic data storage device to generate correlations of data from the array of acoustic transducers based upon a current estimate for at least one of density and velocity of the geologic formation, and perform a linear optimization based upon a plurality of different combinations of the correlations to determine a given subset of correlations having a highest objective function associated therewith. The processor may also update the current estimate for at least one of density and velocity of the geologic formation based upon the given subset of correlations.

More particularly, the processor may perform the linear optimization based upon a genetic linear optimization. Additionally, the processor may further generate weights for the given subset of correlations, and update the current estimate for at least one of density and velocity based upon the generated weights. By way of example, the processor may generate the weights using Q-learning.

Furthermore, the processor may also determine an error associated with the updated estimate for at least one of density and velocity, and when the error is greater than a threshold, repeat generating the correlations based upon the updated estimate for at least one of density and velocity and performing the linear optimization based thereon. The plurality of different combinations may include at least one combination with less than all of the available correlations, for example. The processor may also be configured to determine an anomaly based upon the updated at least one of velocity and density of the geologic formation. By way of example, the geologic formation may be at least one of a land geologic formation and a subsea geologic formation.

A related method is for processing seismic data for a geologic formation generated by an array of acoustic transducers responsive to an acoustic source. The method may include using a processor to generate correlations of data from the array of acoustic transducers based upon a current estimate for at least one of density and velocity of the geologic formation, perform a linear optimization based upon a plurality of different combinations of the correlations to determine a given subset of correlations having a highest objective function associated therewith, and update the current estimate for at least one of density and velocity of the geologic formation based upon the given subset of correlations.

DETAILED DESCRIPTION OF THE EMBODIMENTS

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

By way of background, with respect to subsea geographic formations beneath the ocean floor, "gas clouds" or other obstructions may result in anomalies which distort the P wave seismic signal, either obstructing the payzone (oil) or making the payzone look much deeper than it is. Seismic shear waves are typically too expensive to shoot on a recurring basis (although the techniques described herein may be used with both P wave and S wave signals). As a result, it is not uncommon to drill dry wells and/or miss potential payzones, which may be very expensive.

Figure 1:
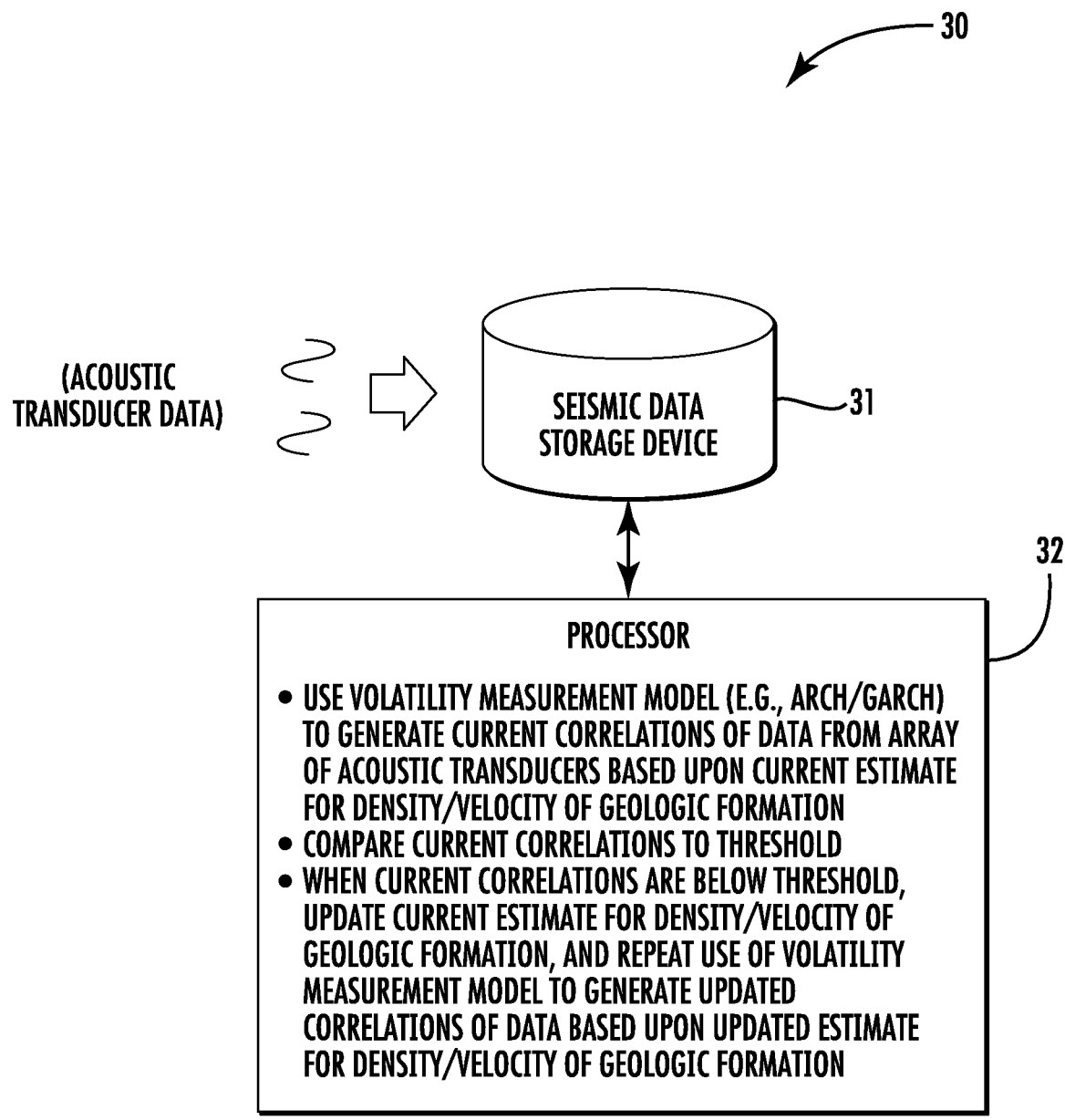
FIG. 1 is a schematic block diagram of a system for processing seismic data in accordance with an example embodiment.
Figure 2:
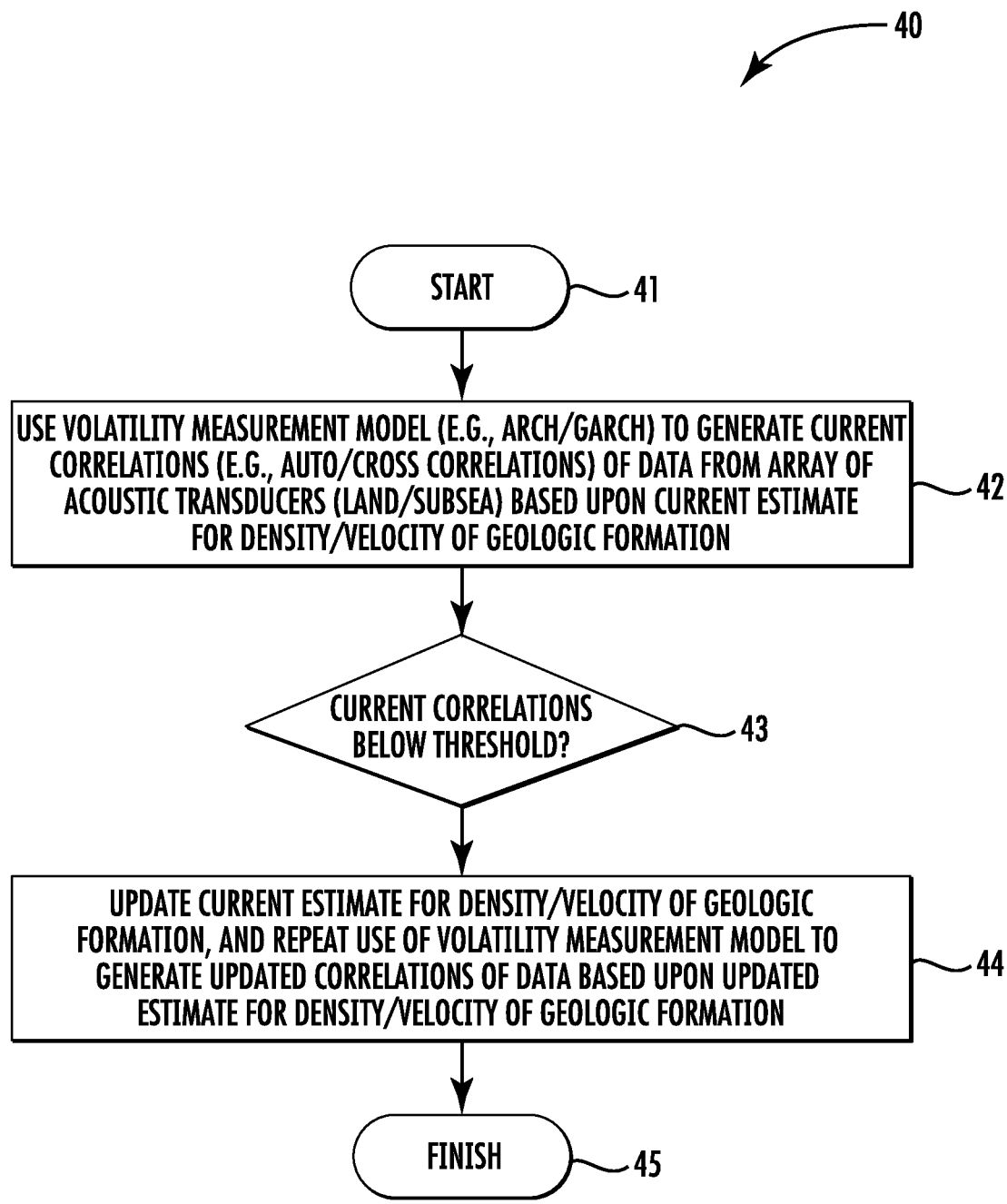
FIG. 2 is a flow diagram illustrating method aspects associated with the system of FIG. 1.
Figure 3:
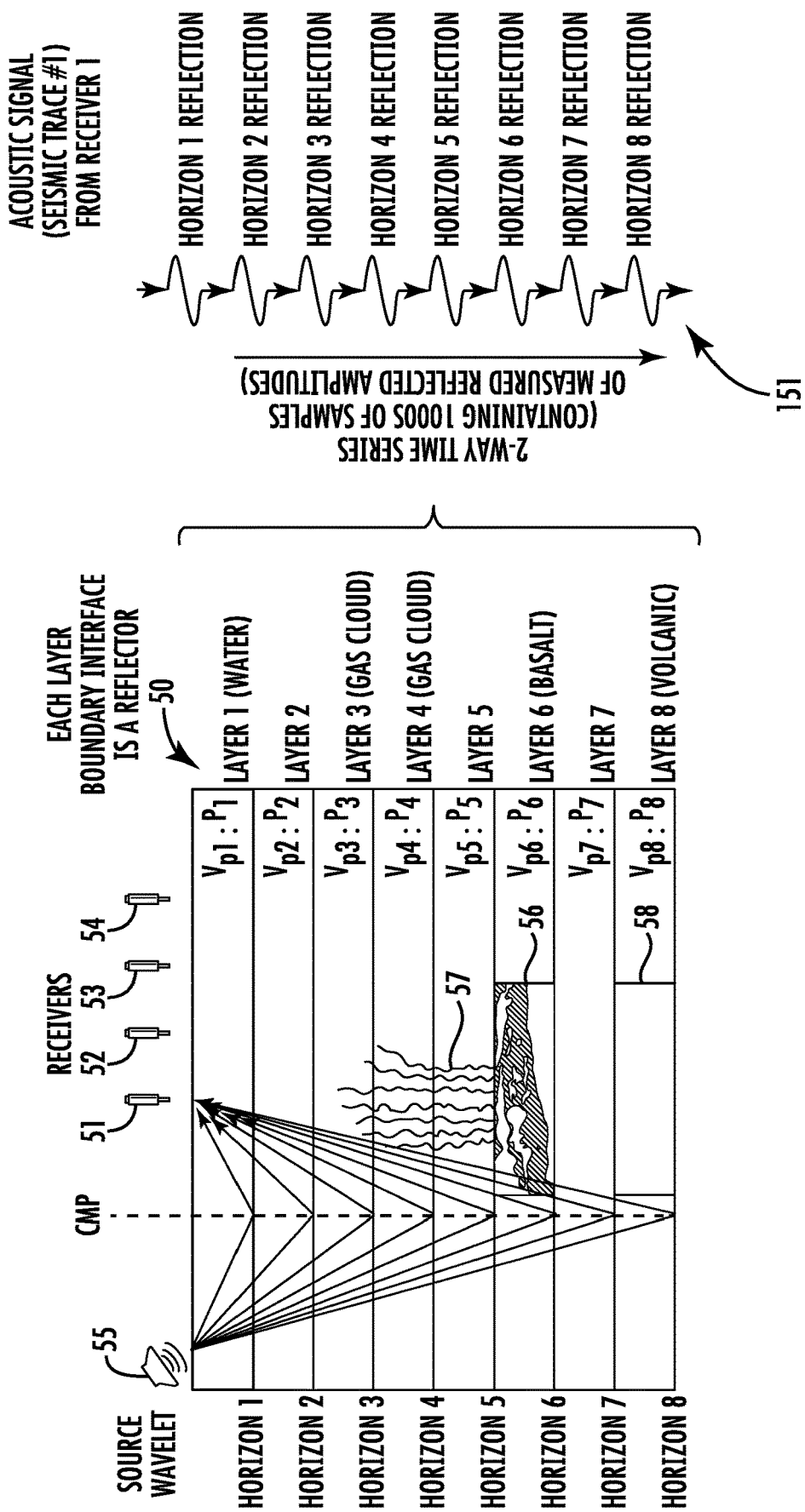
FIG. 3 is a schematic diagram illustrating a seismic survey of a geologic formation and the associated acoustical signals from a single acoustical transducer which may be processed by the system of FIG. 1.
Figure 4:
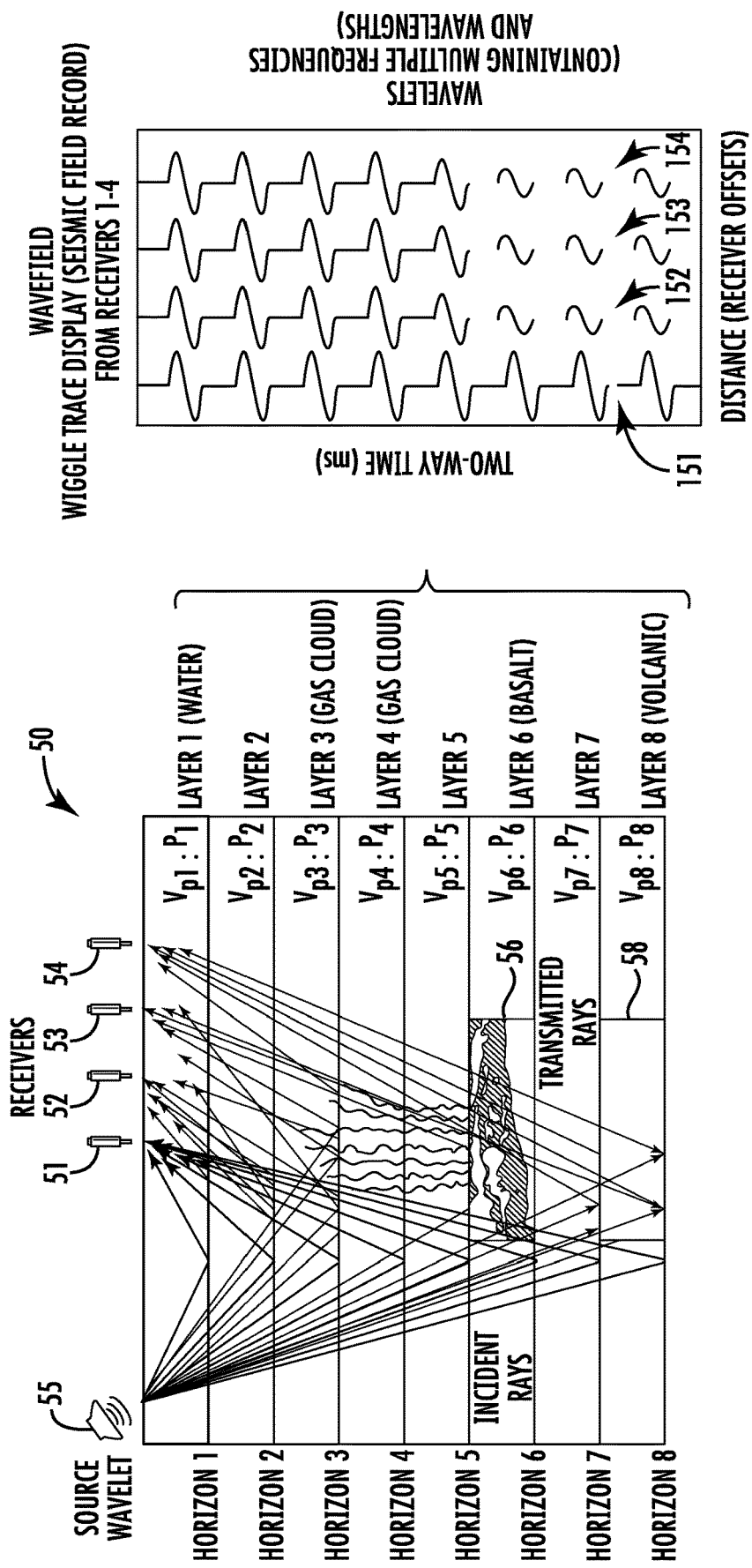
FIG. 4 is a schematic diagram illustrating a seismic survey of a geologic formation and the associated acoustical signals from a plurality of acoustical transducers which may be processed by the system of FIG. 1.

Referring initially to FIGS. 1-4, a system 30 and associated method for processing seismic data to more accurately identify seismic anomalies for a geologic formation 50 generated by an array of four acoustic transducers 51-54 responsive to an acoustic source 55 is first described (although other numbers of acoustic transducers may be used in different embodiments). In FIGS. 3-4, the effects of anomalies on seismic P wave data in a subsea geologic survey are demonstrated. However, it should be noted that the same techniques described herein may also be used for land-based geologic surveys as well.

More particularly, in FIG. 3, only the P wave signals received by the acoustic transducer 51 (here a hydrophone) are shown. The geologic formation 50 in the illustrated example includes eight different geological layers (including the ocean layer at the top), and the respective boundaries between the layers are referred to as horizons 1-8. With respect to the returns seen by the acoustic transducer 51, the boundary transitions in the corresponding acoustic return signal 151 are often regular and pronounced as seen in the right hand side of the figure, since all of the boundary reflections occur where there is no gas cloud or other obstruction in the acoustic signals that comprise the stacking of the common midpoint CMP. Seismic reflection occurs when acoustic impedance (v*p) changes at a horizon (layer boundary), resulting in the "wiggle" in the acoustic signal trace 151 seen in FIG. 3.

However, in FIG. 4 the acoustic P wave signatures 152-154 respectively received by the acoustic transducers 52-54 are also shown, and it will be seen that for these signatures the horizons 5-8 are distorted due to the presence of seismic anomalies. More particularly, seismic anomalies are objects such as gas clouds, volcanic layers, basalt, etc., which distort the acoustic signal, and hence the velocity model, of a seismic survey. In the illustrated example, a gas cloud (illustrated as vertical squiggles 57) is within the third and fourth geological layers, a basalt deposit 56 is located in the sixth geological layer, and a volcanic deposit 58 is illustratively located within the eight geological layer. It should be noted that while the basalt and volcanic deposits 56, 58 is shown as rectangles completely within their respective geological layers for clarity of illustration, the shapes of gas clouds or other obstructions may be irregular and transcend different boundaries between geological layers in different instances.

Without distortion of the P waves, a more accurate approximation of the velocity of the returning signals based upon the known distance between the source 55 and the given acoustic transducer 51-54 may be achieved. The velocity data may be used to estimate the density, composition, and location of the various layers in the geologic formation 50, but the anomalies often make these estimations inaccurate such that wells are drilled in the wrong location or to the wrong depth in many cases.

The system 30 may advantageously provide enhanced accuracy in determining non-linear velocity parameters at different geological layers and multiple signals for global minimum error. The system 30 illustratively includes a seismic data storage device 31 and a processor 32. The storage device 31 may include one or more memories such as disk drives, FLASH drives, etc., and the processor 30 may be implemented using the hardware of one or more servers, workstations, or other computing devices (e.g., microprocessors, etc.) and associated non-transitory computer-readable medium having computer-executable instructions for performing the various operations set forth herein.

With reference to the flow diagram 40 of FIG. 2, beginning at Block 41, the processor 30 may cooperate with the seismic data storage device 31 to use a volatility measurement model to generate current correlations of data from the array of acoustic transducers 51-54 based upon a current estimate for density and/or velocity of the geologic formation 50, at Block 42. In accordance with one example implementation, velocity estimates may be generated, from which corresponding density estimates may be derived based upon a lookup table.

The processor 32 may compare the current correlations to a threshold. When the current correlations are below the threshold, at Block 43, the processor 32 may update the current estimate for density/velocity of the geologic formation, and repeat use of the volatility measurement model to generate updated correlations of data from the array of acoustic transducers based upon the updated estimate for at least one of density and velocity of the geologic formation, at Block 44. The method of FIG. 2 illustratively concludes at Block 45.

Figure 5:
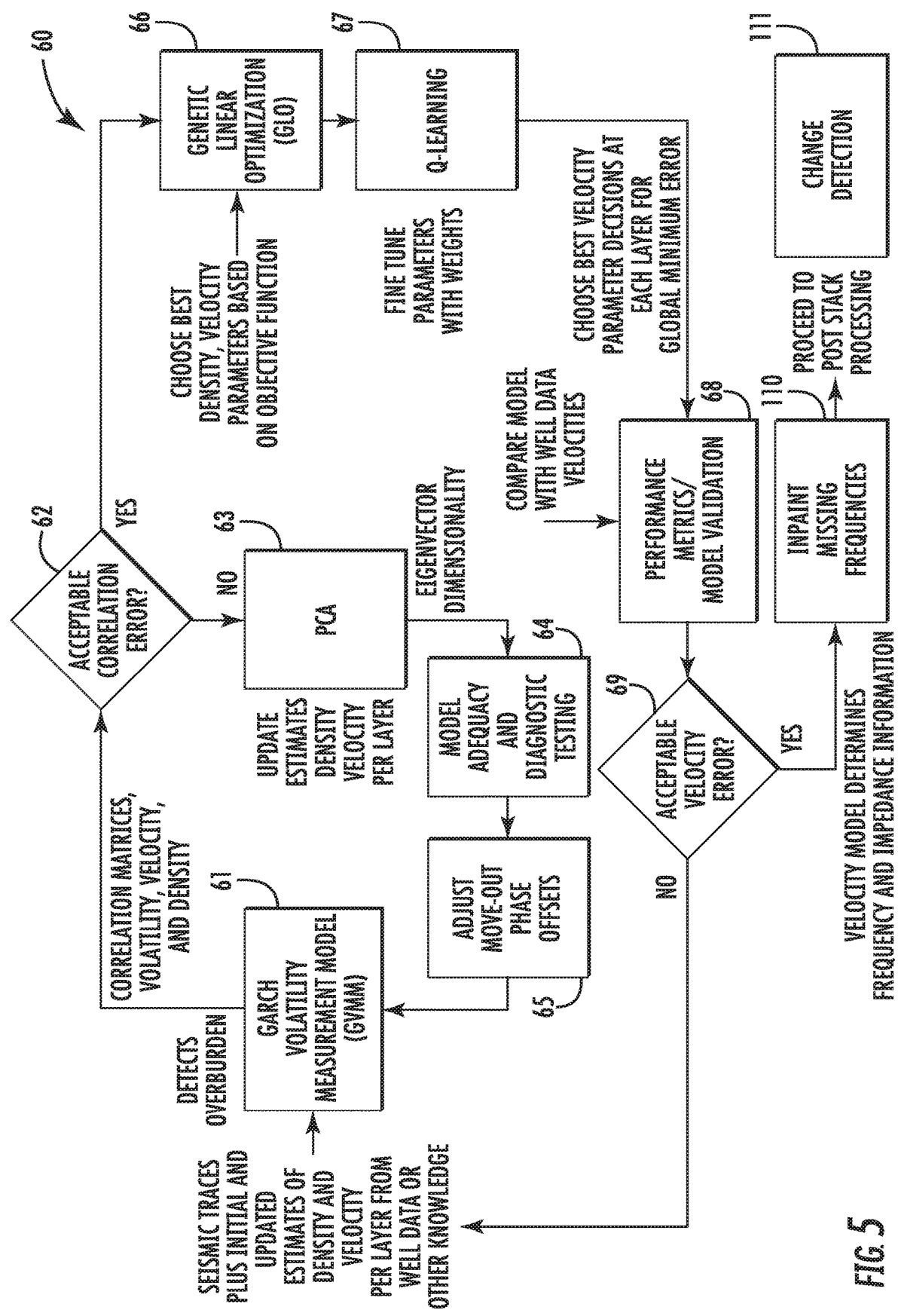
FIG. 5 is a schematic block diagram of a system for modeling a geologic formation in accordance with an example embodiment which may incorporate elements of the system of FIG. 1.

The foregoing will be further understood with reference to the processing flow diagram 60 of FIG. 5. The processor 32 may use various volatility measurement models, such as an Autoregressive Moving Average (ARMA), an Autoregressive Integrated Moving Average (ARIMA), and Autoregressive Conditional Heteroscedastic Model (ARCH), a Generalized Autoregressive Conditional Heteroscedastic Model (GARCH), etc. In the example of FIG. 5, a GARCH volatility model is used. The seismic traces (e.g., P wave signatures) may be provided as inputs to a GARCH volatility measurement model, at Block 61, in addition to initial updated estimates of density and/or velocity per layer, which may come from core samples from the geographic formation 50, for example.

The GARCH model advantageously measures auto and cross correlation matrices as well as covariance matrices of reflectivity and impedance and provides associated volatility, and hence velocity, and density estimates. The GARCH model includes robust descriptors which may be utilized in the seismic domain to provide descriptors for volatility, as well as auto correlations for each respective acoustic signal 151-154 and cross correlations between these acoustic signals. The GARCH model is advantageously applied to the gathers of seismic pre-stack traces. Such intervention using the GARCH model helps correct initial velocity errors and prevent error propagation and compounding. That is, the correlation may advantageously help to transform the "raw" velocity estimates from the initial acoustic signals 151-154 into a more accurate velocity data to enhance anomaly interpretation and mapping within the geologic formation 50. An example GARCH model including a volatility modeling component and a fitted mean component is as follows:

Mean equation: $r_t = \mu + \sum_{i=1}^{m} \alpha_i r_{t-i} + \sum_{j=1}^{n} \beta_j a_{t-j}$ Volatility equation: $\sigma_t^2 = \omega_0 + \sum_{i=1}^{p} \alpha_i a^2_{t-i} + \sum_{j=1}^{q} \beta_j \sigma^2_{t-j}$ The Autoregressive Moving Average (ARMA) model achieves parsimony by melding the Autoregressive (AR) and Moving Average (MA) models. ARMA is effective in engineering applications that model time series as well as in applications requiring the modeling of volatility such as the financial domain. The Generalized Autoregressive Conditional Heteroscedastic (GARCH) model is an extension of the ARMA model to further reduce complexity and dimensionality in regards to ARMA. Fitting a GARCH model to a data set requires a formula with an ARMA component input and a GARCH component input, where the ARMA component output represents the mean equation (specifying the conditional mean), and the GARCH component output represents the volatility equation (specifying the conditional variance). The resulting output coefficients are used to build the equations. In general:

t, t–i, t–j=points in time
$\Sigma$=summation
For ARMA (m, n) equations:
$r_t$=change time series
$\mu$=mu, mean
$\alpha$=alpha, autoregressive (ARCH) coefficients
$\beta$=beta, moving average (GARCH) coefficients
$\{a_t\}$=white noise series
m=order of autoregressive (AR) terms
n=order of moving average (MA) terms
For GARCH (p, q) equation:
$\sigma$=standard deviation
$\sigma_2$=variance
$\sigma_t^2$=response forecast at t
$\omega_0$=omega, constant
p=order of GARCH terms $\sigma^2$
q=order of ARCH terms $a^2$ GARCH models the time series as a change series. The change series is constructed by computing the difference between each successive time series value. The difference between values at time t and time t–k is called the lag. Lags of the GARCH model represent the seismic phase offset and seismic move-out distance in modeling seismic anomalies and obstructions. For time series $r_t$, auto-correlations of the GARCH model (a collection of correlation coefficients between $r_t$ and $r_t$–k) models the dynamic dependence of the seismic data set, in particular the seismic anomaly or obstruction.

The mean equation models stability, whereas non-stable periods of time are considered volatile and are referred to as volatility clusters. GARCH represents seismic obstructions and anomalies as volatility clusters. The conditional variance equation of the GARCH model represents the volatility measurement of the modeled data set's volatile time period and represents such as the seismic anomaly and/or obstruction. Cross-correlations of the GARCH model are used to measure the relationship between different seismic data sets and/or any supplementary/complimentary well data sets (i.e., core, observation, delineation, exploration, production well data sets) for applications of similarity, disparity, and/or fusion for corroboration of seismic anomaly and obstruction correlation tables. High level GARCH process performance steps may include:
  a. Test for Leverage and ARCH Effects
  b. Diagnostics, Model Adequacy & Selection
  c. Perform Forecast for Mean and Volatility with Confidence Intervals
  d. Capture Covariance and Correlation Matrixes
  e. Capture Model Performance Metrics (in and out of sample)
  f. Use Root Mean Square Error (RMSE) and Mean Absolute Error (MAE) for model validation
  g. Iterate as necessary based on requirements More particularly, the volatility component is the conditional correlation and covariance that describes the given obstruction causing the anomaly.

The processor 32 may further determine whether the correlation matrices generated by the GARCH model have an acceptable correlation error or threshold associated therewith, at Block 62. That is, the correlation values may be used as measurements of how well the acoustic signatures agree about the geologic formation 50 and associated impedances based on velocity and density parameters.

If the current correlations are below the threshold, the processor 32 may further perform a principal component analysis (PCA) on the current correlations, at Block 63. The PCA model performs dimension reduction in the Eigenvalue domain, and clusters similar Eigenvectors. The results of the PCA model may then be used for model adequacy and diagnostic testing, at Block 64. This may include comparing the Eigenvector dimensionality results with truth data, such as core sample data, for example. The model adequacy and diagnostic testing block analyzes the number of eigenvalues from Block 63. Fewer eigenvalues required to model the combined traces is an indication of stronger correlation.

The results of the diagnostic testing may then be used to adjust the move-out phase offsets associated with each of the acoustic transducers 51-54, at Block 65. More particularly, the velocity of sound determination directly depends on and correlates to the geology of the geologic formation. The move-out phase adjustment advantageously "tunes" the velocity parameters via the preceding correlation measures to methodically adjust the velocity model, and therefore the associated move out distances (phase changes). The updated velocity data may then once again be processed using the GARCH model and the subsequent steps described above, until velocity parameters with associated move out distances are obtained which result in the best correlation of traces, which will be the desired velocity choice and ultimately provide the most accurate estimate of the material types within the different geologic layers at respective locations.

Figure 6:
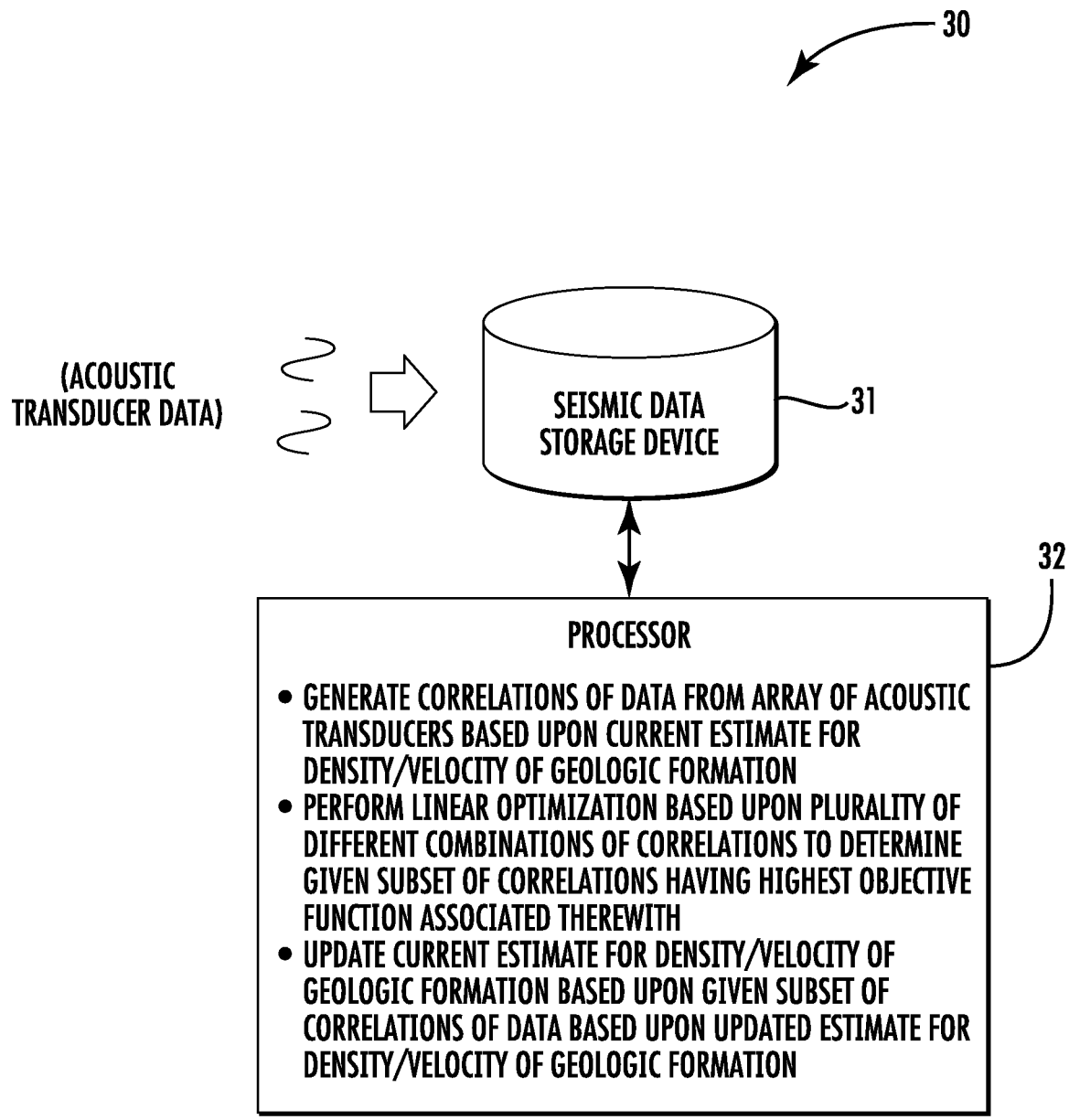
FIG. 6 is a schematic block diagram of a system for processing seismic data in accordance with another example embodiment.
Figure 7:
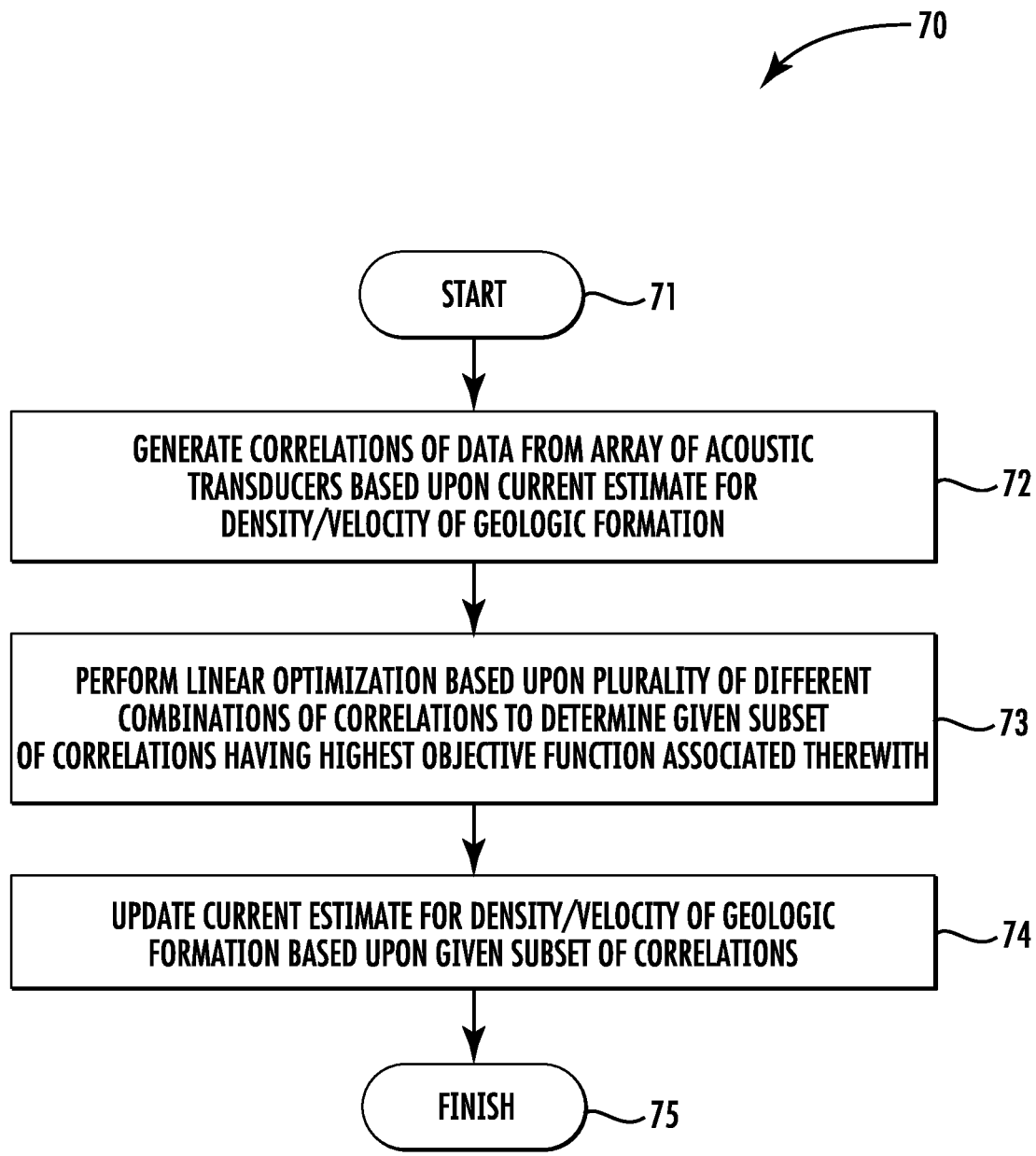
FIG. 7 is a flow diagram illustrating method aspects associated with the system of FIG. 6.

Referring additionally to FIG. 6 and the flow diagram 70 of FIG. 7, further operations with respect to the velocity parameter determination will now be described. Seismic data processing may be very computationally expensive given the large volumes of data involved and since rock velocity and density change significantly as a function of position and depth. As such, in some embodiments the processor 32 may further use an adaptive approach to determine a desired choice for non-linear velocity parameters at different rock layers and multiple signals for global minimum error.

Continuing with the example from FIG. 5, once the desired correlations of data from the array of acoustic transducers 51-54 have been generated (Block 72) that meet the acceptable correlation error (Block 62 of FIG. 5), as discussed above, the processor 32 may perform a linear optimization (e.g., a genetic linear optimization) based upon a plurality of different combinations of the correlations to determine a given subset of correlations having a highest objective function associated therewith, at Block 73 (Block 66 of FIG. 5). Furthermore, the processor 32 may also update the current estimate for at least one of density and velocity of the geologic formation based upon the given subset of correlations, at Block 74, which illustratively concludes the method of FIG. 7 (Block 75).

The objective function is calculated for a number of combinations of correlations, which in this example are harvested from the GARCH model, and associated density and velocity estimates. However, in other embodiments the correlations may be obtained for other models, such as those noted above. Generally speaking, a genetic algorithm is used to solve both constrained and unconstrained optimization problems based on a natural selection process that mimics biological evolution. The algorithm repeatedly modifies a population of individual solutions. At each step, the genetic algorithm randomly selects individuals from the current population and uses them as parents to produce the children for the next generation. Over successive generations, the population "evolves" toward an optimal solution.

In the present case, a genetic approach to a linear optimization (also know as linear programming) is used. Linear programming is an approach to achieve the best outcome (such as maximum profit or lowest cost) in a mathematical model whose requirements are represented by linear relationships. More particularly, linear programming is used for the optimization of a linear objective function, subject to linear equality and linear inequality constraints. Its feasible solution region is a convex polyhedron, which has a plurality of spaces therein each defined by a linear inequality. Its objective function is a real-valued affine (linear) function defined on this polyhedron. Generally speaking, linear programming finds a point in the polyhedron where this function has the smallest (or largest) value if such a point exists. In the present case, the processor 32 performs linear programming in a genetic fashion to search for the smallest point in different spaces of the polyhedrons defined by different respective combinations of the available correlations, to find the best solution from among the various different possibilities, as will be discussed further below. More particularly, the genetic approach is used to invert for the effective-medium properties due to the strong nonlinearity of the geologic anomalies, in particular gas clouds. Thus, the present approach may conceptually be considered as a combination of a genetic algorithm and a linear program to create an enhanced game theory decision approach referred to herein as a Genetic Linear Optimization (GLO) model.

Figure 8:
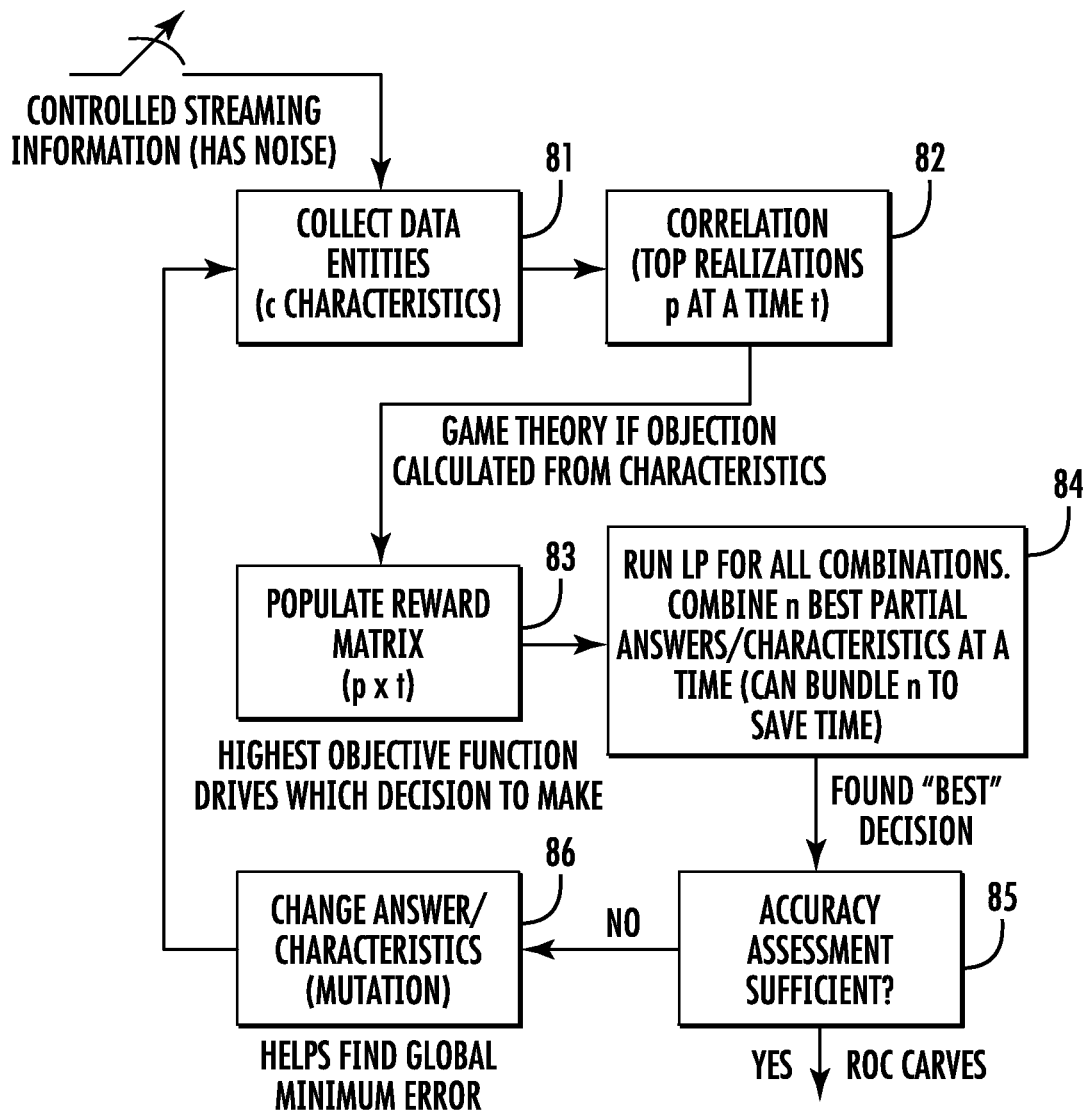
FIG. 8 is flow diagram illustrating further method aspects associated with the system of FIG. 6.

An example GLO model approach which may be implemented by the processor 32 is shown in the flow diagram 80 of FIG. 8. Controlled streaming information (with noise) is provided as an input, from which data entities for a given number of characteristics (here correlations) are collected, at Block 81. A correlation of the top realizations at a given time is performed, at Block 82, followed by a "game theory" approach which calculates the objective function from the correlations to populate a reward matrix (here a p×t matrix for p realizations at a time t), at Block 83. An example reward matrix is set forth in the following table:

|  | Metric 1 | Metric 2 | Metric 3 | Metric 4 | Metric 5 |
| --- | --- | --- | --- | --- | --- |
| Realization 1 | a11 | a12 | a13 | a14 | a15 |
| Realization 2 | b21 | b22 | b23 | b24 | b25 |
| Realization 3 | c31 | c32 | c33 | c34 | c35 |
| Realization 4 | d41 | d42 | d43 | d44 | d45 |
| Realization 5 | e51 | e52 | e53 | e54 | e55 |

Where $$v - a_{11}x1 - b_{21}x2 - c_{31}x3 - d_{41}x4 - e_{51}x5 - f_{61}x6 \leq 0$$

$$v - a_{12}x1 - b_{22}x2 - c_{32}x3 - d_{42}x4 - e_{52}x5 - f_{62}x6 \leq 0$$

$$v - a_{13}x1 - b_{23}x2 - c_{33}x3 - d_{43}x4 - e_{53}x5 - f_{63}x6 \leq 0$$

$$v - a_{14}x1 - b_{24}x2 - c_{34}x3 - d_{44}x4 - e_{54}x5 - f_{64}x6 \leq 0$$

$$v - a_{15}x1 - b_{25}x2 - c_{35}x3 - d_{45}x4 - e_{55}x5 - f_{65}x6 \leq 0$$

and $$x1 + x2 + x3 + x4 + x5 + x6 = 1$$

$$x1, x2, x3, x4, x5, x6 \geq 0$$

The initial solution for desired mixed strategy in terms of probabilities is:

$$x = (x1, x2, x3, x4, x5, x6).$$

The linear program parameters may include sediment, as well as water and gas layer velocities and/or densities, for example and a minimum or maximum solution approach may be used.

The highest objective function drives which decision to make, and the linear programming may then be run for all of the desired combinations, at Block 84. Once the "best" decision is determined, an accuracy assessment may be performed, at Block 85. If the desired accuracy is achieved, then the linear programming is completed and receiver operating characteristic (ROC) curves may be generated, if desired. Otherwise, the answer characteristics may be changed (Block 86) and the above-noted steps repeated so that the global error minimum may be located.

Figure 9:
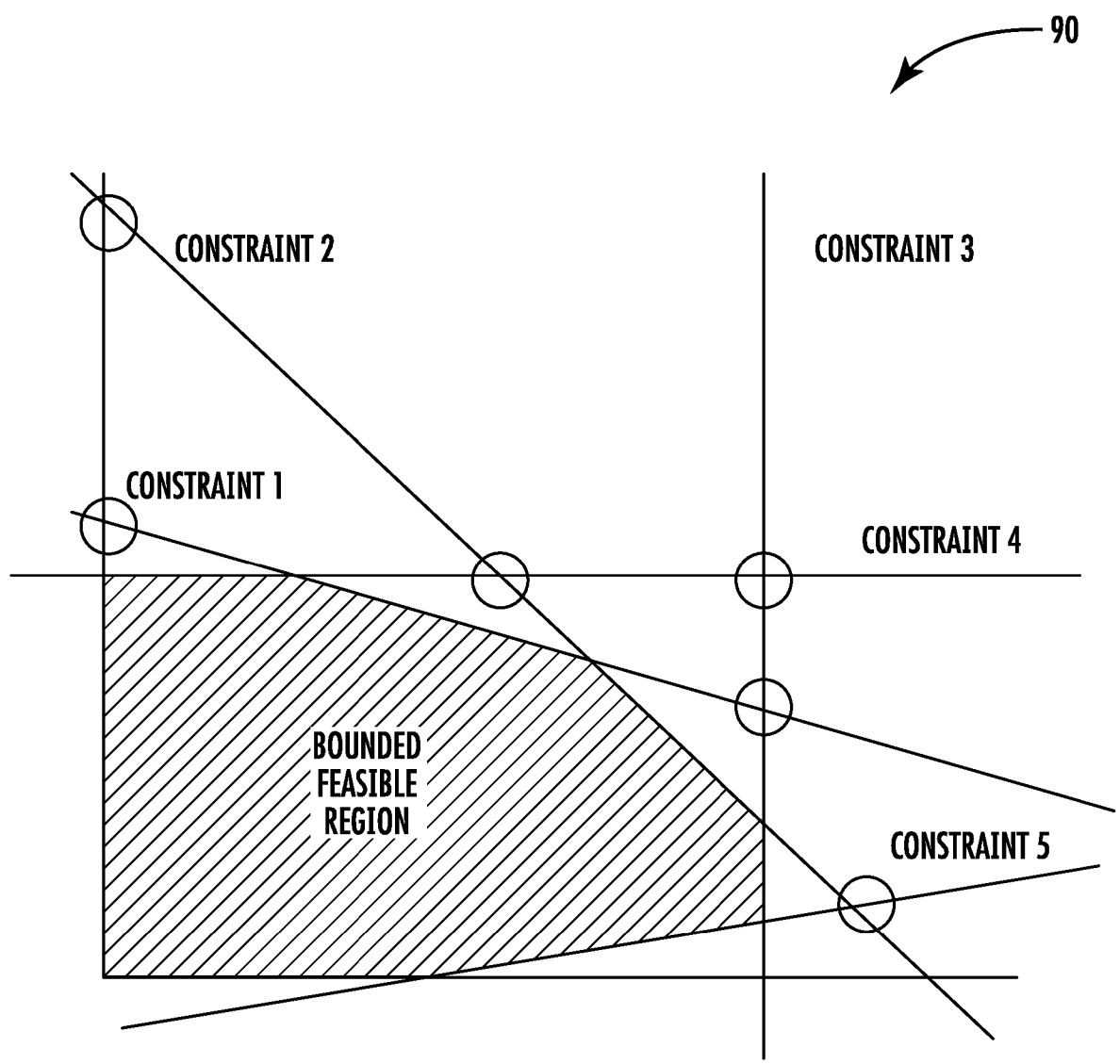
FIG. 9 is a graph illustrating bounded feasibility regions for different combinations of correlations which may be used in accordance with an example embodiment.

Referring additionally to the graph 90 of FIG. 9, one reason for running all combinations of decisions, 2P−1, where P is the number of rows (realizations or "players" or decisions) in a reward matrix, is that one or more constraints eliminate possible feasible solutions, as shown by the circles at the intersections points in the graph 90. A feasible region is a graphical solution space for a set of all possible points of an optimization problem that satisfy the problem's constraints. The above-described approach advantageously treats information as parameters, rather than constraints, to make a decision outside of the traditional feasible region using different subsets of the constraints. This allows the present approach to work robustly with complex data for decision making applications. It should be noted that the example shown in FIG. 9 is a simplified representation which in some implementations may have multiple dimensions.

Equation (1) shows an example of constraints where each row in the equation corresponds to a row in the reward matrix.

$$A.*\begin{bmatrix} 1 & 1 & 1 & 1 & 1 \\ 1 & 1 & 1 & 1 & 0 \\ 1 & 1 & 1 & 0 & 1 \\ \vdots & & & & \\ 0 & 0 & 0 & 1 & 1 \\ 0 & 0 & 0 & 1 & 0 \\ 0 & 0 & 0 & 0 & 1 \end{bmatrix} \quad (1)$$

The combinations refer, for example, to each row (decision or player) which is multiplied by a binary matrix allowing all combinations of possible decisions or players taken 1 to P at a time. This operation increases the run time, but it is trade-off for improved accuracy. This approach also helps to ensure that the desired answer is found by computing the proper objective function. If, for example, A represents the reward matrix, then the solution for computing all combinations of rows is as shown in equation (1), above.

Figure 10:
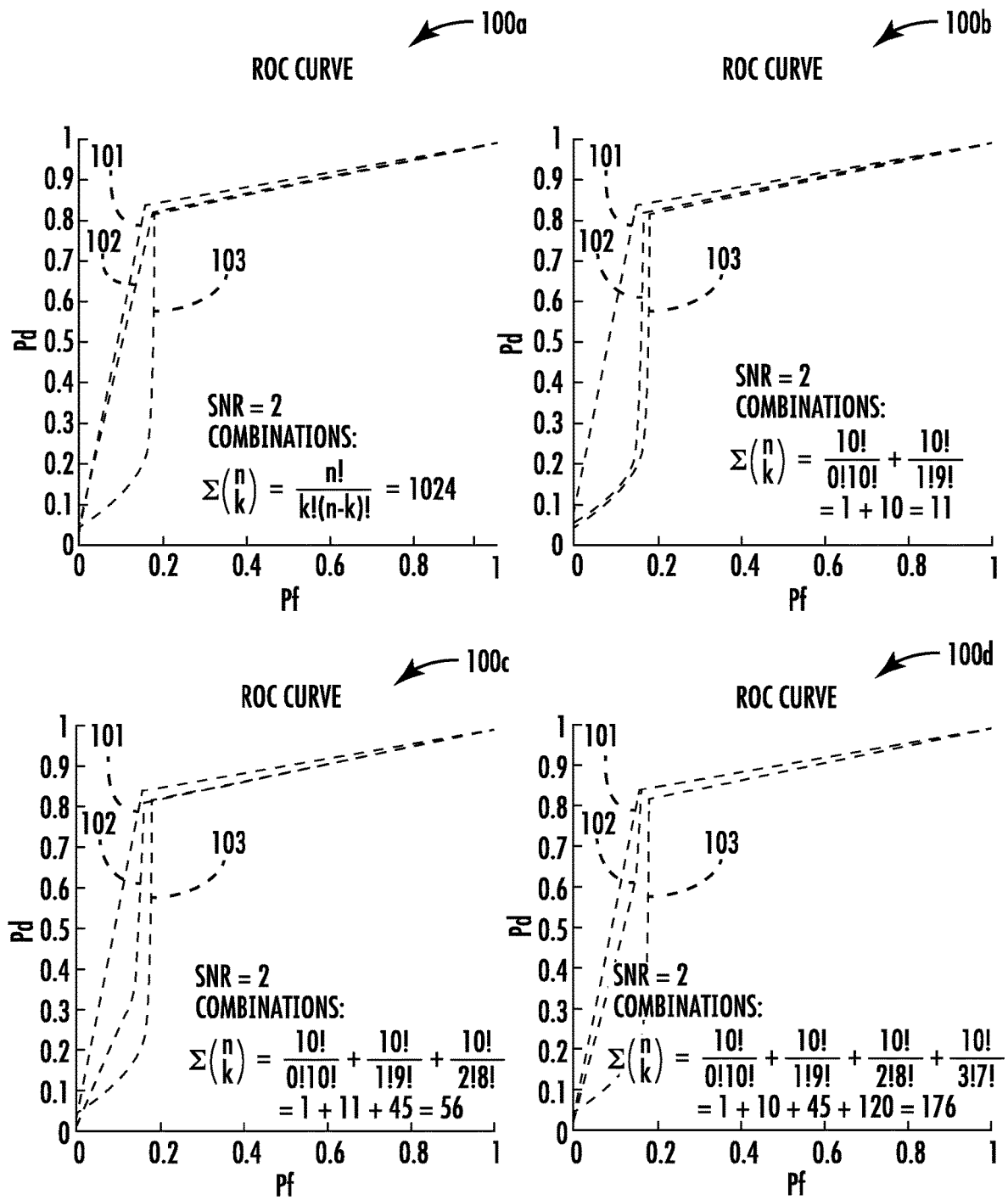
FIG. 10 is a series of receiver operating characteristic (ROC) curves for different combinations of correlations in accordance with example embodiments.

Turning to FIG. 10, a series of four ROC curves 100a-100d are shown. Running the linear program for all combinations may be relatively time consuming. In the ROC curves, the plot 101 corresponds to the GLO and correlation with all realizations and all combinations with a feedback loop, combining the top 100 best partial answers. The plot line 102 corresponds to a GLO model and correlation with all realizations and all combinations, while the plot line 103 corresponds to straight linear programming and correlation with all realizations.

The ROC curves 100a-100d demonstrate a sensitivity analysis trade off vs. accuracy and speed. The top left graph 100a shows the results after running all combinations for ten players, $2^{10}$=1024. This approach provides the best accuracy but takes the longest processing time. The graph 100b at the top right shows accuracy for considering only ten players at once (linear program) and all nine player combinations. In this case, the linear program results almost equal the correction, and therefore a straight linear program and GLO have nearly the same accuracy. The bottom left graph 100c shows the sensitivity of adding in the consideration of all eight player combinations. The bottom right graph 100d shows perhaps the best trade-off where we additionally consider adding in all seven player combinations. This graph has a reduced processing time yet still achieves nearly the best accuracy, similar to that shown in the top left graph 100a for all ten player combinations.

Processing time in this example is linear, so that the time to run all combinations of ten, nine, eight, and seven players is 176/1024 of the processing time required to run all combinations of players from ten to one, as shown in the top left graph 100a results. However, it will be appreciated that different applications may have different requirements for processing performance, thus different combinations may be appropriate for the GLO analysis in different embodiments.

Referring once again to FIG. 5, in some embodiments, a Q-learning operation (Block 67) may be incorporated to provide weighting for the GLO processing to help learn the velocity and density based on the GARCH correlation inputs for the acoustic signals 151-154 as part of the GLO processing. More particularly, Q-learning may be used for function approximation, which makes it possible to apply the GLO model to large problems, even when state space is continuous, and therefore extremely large. This approach helps to learn what the weights for each dimension should be to achieve desired system performance. This approach may also save money by offering a Pareto efficient, repeatable process. An example Q-learning approach from the sensor domain is as follows:

$$newWeight = \frac{(1 - errorA, B, C, D, E_{nom}) * (NashEquilibriumValue)}{\Sigma_{vparams}(1 - errorA, B, C, D, E_{nom}) * (NashEquilibriumValue)}$$

where A, B, C, D, and E are parameters.

$$QLearnedWeight = oldWeight + learningRate * (newWeight - oldWeight)$$

This approach may advantageously combine remote sensing decision making with Nash Equilibrium for sensor optimization. By calculating all Nash Equilibrium possibilities per sampling period, optimization of sensor allocation is achieved for overall higher system efficiency. This approach for sensor prioritization advantageously collapses multi-dimensional problems to use linear programming optimization. This may advantageously provide desired strategies, resource allocation and increased likelihood of a best decision available using game theory in a zero or constant sum game. Moreover, the sampling of continuous Earth observation data may significantly simplify the problem.

In accordance with one example approach, the above-described GLO models may be implemented as follows (although other approaches may be used in different embodiments):

| | | | | |
|---|---|---|---|---|
| Computational Complexity | $2^N - 1$ (bundle 10 at a time with no repetition) | | | |
| Weighting | Q-Learning of velocity and density parameters | | | |
| Objective Function | Options: Simplex Dual-Simplex Runge-Kutta | | | |
| Error Analysis | RMSE between observed and actual reflectance | | | |
| | n | Layer | vp [m/s] | ρ [kg/m3] |
| Example Parameters | 1 | Water | 1500 | 1000 |
| | 2 | Sediment 1 | 1590 | 2180 |
| | 3 | Gas Body | 1250 | 1830 |
| | 4 | Gas Inclusions | 860 | 1830 |
| | 5 | Sediment 2 | 1900 | 2220 |
| | 6 | Sediment 3 | 2100 | 2253 |
| | 7 | Sediment 4 | 2700 | 2470 |
| | 8 | Sediment 5 | 3000 | 2750 |

The best velocity parameter decisions from the GLO/Q-learning determination may be compared with truth data at Block 68 (as described above with respect to Block 64), and if an acceptable velocity error (e.g., based upon a threshold) is achieved, then impedance and frequency data may be determined, from which further operations may be performed, such as inpainting or repair of missing frequencies to provide an enhanced model of the geologic formation, at Block 110, as well as further post stack processing (e.g., change detection). Example approaches for inpainting of missing frequencies and change detection are respectively set forth in U.S. Patent Publication No. 2017/0248713, published Aug. 31, 2017 and U.S. Patent Publication No. 2017/0248712, published Aug. 31, 2017, both of which are assigned to the present Assignee and are hereby incorporated herein in their entireties by reference. With the enhanced accuracy of the frequency and impedance data, anomalies with the geologic formation 50 may accordingly be determined and the effects thereof mitigated.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A system for processing seismic data for a geologic formation generated by an array of acoustic transducers responsive to an acoustic source, the system comprising:
   a seismic data storage device; and
   a processor cooperating with the seismic data storage device to
      generate auto or cross-correlations of seismic P wave data from the array of acoustic transducers based upon a current estimate for velocity of the geologic formation and without measured and estimated seismic S wave data,
      perform a linear optimization based upon a plurality of different combinations of the correlations of seismic P wave data to determine a given subset of correlations having a highest objective function value associated therewith,
      update the current estimate for velocity of the geologic formation based upon the given subset of correlations,
      estimate density, composition, and location of various layers in the geologic formation including an oil payzone based upon the updated current estimate for velocity of the geologic formation so that a well is not drilled in a wrong location for the oil payzone.

2. The system of claim 1 wherein the processor performs the linear optimization based upon a genetic linear optimization.

3. The system of claim 1 wherein the processor further generates weights for the given subset of correlations, and updates the current estimate for velocity based upon the generated weights.

4. The system of claim 3 wherein the processor generates the weights using Q-learning.

5. The system of claim 1 wherein the processor further determines an error associated with the updated current estimate for velocity, and when the error is greater than a threshold, the processor repeats generating the correlations based upon the updated current estimate for velocity and performing the linear optimization.

6. The system of claim 1 wherein the plurality of different combinations includes at least one combination with less than all of the available correlations.

7. The system of claim 1 wherein the processor is configured to determine an anomaly based upon the updated current estimate for velocity of the geologic formation.

8. The system of claim 1 wherein the geologic formation comprises at least one of a land geologic formation and a subsea geologic formation.

9. A system for processing seismic data for a geologic formation generated by an array of acoustic transducers responsive to an acoustic source, the system comprising:
   a seismic data storage device; and
   a processor cooperating with the seismic data storage device to
      generate auto or cross-correlations of seismic P wave data from the array of acoustic transducers based upon a current estimate for velocity of the geologic formation and without measured and estimated seismic S wave data,
      perform a genetic linear optimization based upon a plurality of different combinations of the correlations of seismic P wave data to determine a given subset of correlations having a highest objective function value associated therewith,
      generate weights for the given subset of correlations,
      update the current estimate for velocity of the geologic formation based upon the generated weights,
      store the updated current estimate for velocity of the geologic formation in the seismic data storage device, and
      estimate density, composition, and location of various layers in the geologic formation including an oil payzone based upon the updated current estimate for velocity of the geologic formation so that a well is not drilled in a wrong location for the oil payzone.

10. The system of claim 9 wherein the processor generates the weights using Q-learning.

11. The system of claim 9 wherein the processor further determines an error associated with the updated current estimate for velocity, and when the error is greater than a threshold, the processor repeats generating the correlations based upon the updated current estimate for velocity and performing the linear optimization.

12. The system of claim 9 wherein the plurality of different combinations includes at least one combination with less than all of the available correlations.

13. The system of claim 9 wherein the processor is configured to determine an anomaly based upon the updated current estimate for velocity of the geologic formation.

14. The system of claim 9 wherein the geologic formation comprises at least one of a land geologic formation and a subsea geologic formation.

15. A method for processing seismic data for a geologic formation generated by an array of acoustic transducers responsive to an acoustic source, the method comprising:
   using a processor and an associated seismic model data storage device to
      generate auto or cross-correlations of seismic P wave data from the array of acoustic transducers based upon a current estimate for velocity of the geologic formation and without measured and estimated seismic S wave data,
      perform a linear optimization based upon a plurality of different combinations of the correlations at seismic P wave data to determine a given subset of correlations having a highest objective function associated value therewith,
      update the current estimate for velocity of the geologic formation based upon the given subset of correlations, and
      estimate density, composition, and location of various layers in the geologic formation including an oil payzone based upon the updated current estimate for velocity of the geologic formation so that a well is not drilled in a wrong location for the oil payzone.

16. The method of claim 15 wherein the linear optimization comprises a genetic linear optimization.

17. The method of claim 15 further comprising using the processor to generate weights for the given subset of correlations, and update the current estimate for at least one of density and velocity based upon the generated weights.

18. The method of claim 17 wherein the weights are generated based upon Q-learning.

19. The method of claim 15 further comprising using the processor to determine an error associated with the updated current estimate for at least one of density and velocity, and when the error is greater than a threshold, repeat generating the correlations based upon the updated current estimate for at least one of density and velocity and performing the linear optimization.

20. The method of claim 15 wherein the plurality of different combinations includes at least one combination with less than all of the available correlations.

\* \* \* \* \*